Patented Sept. 29, 1953

2,653,892

UNITED STATES PATENT OFFICE 2,653,892

PROCESS FOR TREATING FIBROUS MATERIALS TO IMPROVE THEIR BONDS WITH VINYL CHLORIDE POLYMERS AND THE PRODUCTS THEREOF

Alexander Henderson Gentle and Thomas Jackson, Spondon, near Derby, England, assignors to British Celanese Limited, a corporation of Great Britain No Drawing. Application May 15, 1952, Serial No. 288,038. In Great Britain May 31, 1951

13 Claims. (Cl. 154—136)

This invention relates to bonding and provides a method of bonding polyvinyl chloride and like polymers to continuous filament high tenacity regenerated cellulosic materials and to certain other materials.

It is well known that polyvinyl chloride does not adhere readily to textile materials composed of high tenacity continuous filament regenerated cellulose. The difficulty of obtaining strong adhesion between two components of the kinds specified is not surprising in view of the strong intermolecular forces present in both components, the relatively rigid nature of the regenerated cellulose molecule, the lack of strong forces between molecules of the one component and those of the other, and the smoothness of the filaments, offering little opportunity for the anchorage of an adhesive. In varying degrees the same difficulty arises in bonding polyvinyl chloride to other materials (especially materials composed of continuous filaments) where one or more of the factors referred to above is present. Among such materials are, for example, textile materials of regenerated cellulose of medium or low tenacity, cellulose ester materials, for example textile materials of acetone-soluble cellulose acetate, linear condensation polymers, for example nylon, polyethylene terephthalate and poly-4-amino-1.2.4-triazole, natural silk and the artificial proteinaceous fibres.

In U. S. application S. No. 170,701, filed June 27, 1950 we have described a treatment of high tenacity continuous filament regenerated cellulosic materials and other fibrous materials the molecules of which comprise repeating units containing carbon, hydrogen and a more electro-negative element than carbon, which facilitates the subsequent bonding of the material to rubber. This treatment comprises impregnating the material with a water-insoluble, alcohol-soluble, synthetic resin in solution in a volatile neutral organic liquid that is completely miscible with water and drying the material, the synthetic resin being a product obtainable by condensing formaldehyde with a phenol in molar proportions of $CH_2O$ to phenol ranging from 1:2 to about 1:1 under non-alkaline conditions, the said solution being free from any source of additional formaldehyde.

We have now found that such a treatment of the fibrous materials, and especially of high tenacity continuous filament regenerated cellulose materials, also facilitates the adhesion of these materials to plasticised polyvinyl chloride, and to certain other thermoplastic polymers of vinyl chloride.

According to the present invention, therefore, composite materials are made by bonding a polymer of vinyl chloride, especially an acetone-insoluble homopolymer thereof, to heat-stable fibre-forming material, and especially material comprising fibres, said material being composed of a linear polymer containing recurring units of carbon, hydrogen and an element more electro-negative than carbon, especially material composed of high-tenacity fibres of regenerated cellulose, the said material having a coating of a synthetic resin that is a condensation product of an aldehyde and a phenol.

In this specification "fibre" includes continuous filaments as well as staple fibres; "heat-stable" means capable of being heated to 130° C. in the form of free fibres without shrinkage or decomposition; "high tenacity" means of tenacity at least 3 gms./denier; and "electro-negative" is used in the same sense as in "The Nature of the Chemical Bond" by Linus Pauling, 1940, wherein on page 64 the relative electro-negativities of various elements are specified.

The composite materials of the invention include webs of the vinyl polymer reinforced with yarns of the fibrous material, fabrics of the fibrous material coated with the vinyl polymer and laminates in which layers of fabric composed of or containing the fibrous material are bonded together by the vinyl polymer, the fibrous material in every case having been provided with a coating of the phenol-aldehyde resin before application of the vinyl polymer.

In the phenol-aldehyde synthetic resin the molar ratio of aldehyde to phenol is preferably between 1:2 and 1.1:1, and especially between 8.5:10 and 1.1:1, the phenol is preferably resorcinol, the aldehyde is preferably formaldehyde and the condensation is effected under non-alkaline conditions, i. e. in the presence of an acid catalyst or in the absence of any added catalyst, and is carried to a stage in which the resin formed is insoluble in water but soluble in ethanol. Resins formed in this way from formaldehyde and resorcinol or other phenol having a para and two ortho hydrogen atoms (relative to a hydroxy group) unsubstituted, the molar ratio of formaldehyde to phenol being between 8.5:10 and 1.1:1 are not permanently fusible or permanently soluble as are resins made similarly but from molar ratios of formaldehyde to phenol of less than 8.5:10. On the other hand, compared with resins made from molar proportions of formaldehyde to phenol substantially greater than 1.1:1 and under alkaline conditions, they give softer and more flexible products when subjected to a given heat treatment, e. g. 30 minutes at about 150° C.

The following examples illustrate the invention:

*Example 1*

An aqueous solution was made of the following composition, all the parts being by weight:

26.5 parts of resorcinol,
7.3 parts of paraformaldehyde,
40.2 parts of water.

(Since commercial paraformaldehyde contains 95 to 99% of $CH_2O$, the molar ratio of $CH_2O$ to resorcinol in this solution was between 0.95:1 and 1:1.)

The resorcinol was dissolved in the water at 80° C. and when completely in solution the paraformaldehyde was added with good stirring. The temperature was then raised to 100° C. over a period of 10 minutes after which cooling was applied since the reaction is exothermic. Samples of the reaction mixture were taken at frequent intervals and tested by dropping into cold water. As soon as a sample gave a precipitate in this way the whole reaction mixture was rapidly cooled, and the resin thrown out of solution, by running the reaction mixture into cold water. The resin was then separated from the water and dissolved in industrial alcohol to give a 2% solution. (A sample of the resin after heating at 149° C. for five hours was found to be insoluble in acetone and infusible. A resin made similarly but with a molar ratio of formaldehyde to phenol of 8.0:10 remained fusible and soluble after the same heat treatment.)

A "slipper satin" fabric of weight about 6 oz./sq. yard and composed of "Fortisan" (registered trade-mark) regenerated cellulose yarn of tenacity about 6 gms. per denier made by stretching cellulose acetate yarn in wet steam and saponifying the stretched yarn, was scoured free from oil and impregnated with the 2% resin solution by padding in two stages, with intermediate batching, to leave 1 to 2% of resin on the fabric, and was dried on a pin-stenter.

The treated fabric was coated with polyvinyl chloride plasticised with 150% of its weight of di-(methylcyclohexyl)-phthalate, and stabilised with 1% of its weight of lead stearate, in solution in a mixture of methyl ethyl ketone and methyl isobutyl ketone in the ratio of 3:2 by weight. The coating was carried out by spreading the solution on to the treated fabric, evaporating the solvent and repeating the treatment until a coating of the desired thickness had been obtained. The coated fabric was then pressed for 10 minutes at 148° C.

The coated fabric so obtained was flexible and showed good adhesion between the two components. Tests carried out on the coated material and on a blank made in the same way except that the resin treatment of the fabric was omitted, showed the resin to give a very considerable improvement in adhesion.

*Example 2*

The process was carried out as in Example 1, except that in making the resin the $CH_2O$:resorcinol molar ratio was 8.5:10. A sample of the resin after subjection to the heat treatment described in Example 1 softened but did not melt and only a small proportion was extractable by acetone.

In making the resins of Examples 1 and 2, an acid catalyst can be used, e. g. 1% of oxalic acid based on the weight of resorcinol. Instead of the solvent mixture described, tetramethylene oxide can be used in these examples.

The foregoing examples, together with Example 6 below, show the application of the polyvinyl chloride in solution. We prefer, however, especially when heavier fabrics are used, e. g. in making multiple laminates for belting, to apply the polyvinyl chloride in the form of a dispersion in a plasticizer therefor, this dispersion being converted into a gel by heating the coated fabric. Even stronger adhesion has been obtained in this way possibly since omission of the solvent for the polyvinyl chloride avoids any chance of undesirable solvent action on the resin. Examples 3 to 5 and 7 below illustrate the production of laminates by the method.

*Example 3*

A 2% alcoholic solution of resin was made as described in Example 1.

The solution was applied by the method described in that example to a "Fortisan" (registered trade-mark) belting duck of weight about 20 oz./sq. yd. and composed of continuous filament regenerated cellulose yarn of tenacity 6 gms./denier.

The coated fabric was dried at 80° C. and was coated on one surface by spreading on to it a dispersion of the following composition in which all the parts are by weight:

40 parts of acetone insoluble polyvinyl chloride
60 parts of tricresyl phosphate
2 parts of lead stearate.

The weight of coating applied was 5.2 oz. per sq. ft.

Twenty-four layers of the coated fabric were assembled in a belting press with one layer of uncoated fabric so that in the assembly a layer of the polyvinyl chloride dispersion was between each two layers of fabric and the two outer layers of the assembly were uncoated. The dispersion was then converted into a gel, and the layers of the assembly were bonded together, by pressing for thirty minutes at 1000 lbs./sq. in. This time is not critical and satisfactory products have been obtained, especially in making laminates containing fewer plies, by bonding at the same temperature for as short a time as 10 minutes.

The following example illustrates the improved adhesion obtainable by the method of the invention:

*Example 4*

A laminate was made as described in Example 3, from a layer of coated fabric made as described therein and a layer of uncoated fabric, both fabric layers having received the resin coating as described. The laminate obtained will be referred to as laminate "A." In the same way, except that the "Fortisan" fabrics had not received the resin pre-treatment, a laminate "B" was made. Stripping tests were carried out on samples by the "dead-load" method described in British Standards Specification B. S. 903:50, page 201. The average stripping load for laminate "A" was 25 lbs. per inch strip. That for laminate "B" was only 6.5 lbs. per inch strip.

*Example 5*

The process was carried out as in Example 3, except that the molar ratio of formaldehyde to resorcinol was 1:2 and the resin was made in the presence of 1% based on the weight of resorcinol of oxalic acid added as a 10% aqueous solution to the reaction mixture at 30° C. A sample of this resin after heating for 5 hours at 149° C. remained fusible and completely soluble in acetone.

*Example 6*

In an enamelled kettle provided with a stirrer and a reflux condenser a resin was formed from a reaction mixture of the following composition, all the parts being by weight:

94 parts of common phenol
44 parts of paracetaldehyde
1 part of concentrated (35%) hydrochloric acid With the stirrer operating, the acid was dissolved in the phenol at 50° C. and the paracetaldehyde was run in gradually while keeping the temperature substantially constant. The temperature was gradually raised to the boiling point and the reaction mixture was refluxed keeping the stirrer working until on pouring the sample into water, a dark brown resin separated out. The stirrer was then stopped and the contents of the kettle were allowed to separate into two layers. The resin layer was run into water, well washed and dissolved in industrial alcohol to give a 2% solution. A sample of the resin after subjection to the heat treatment described in Example 1 remained fusible and completely soluble in acetone.

With the solution so obtained a fabric of the kind specified in Example 1, was impregnated, dried, coated with plasticised polyvinyl chloride and subjected to a hot pressing operation as described in that example.

*Example 7*

The process was carried out as in Example 3, except that the resin solution used was as described in Example 6.

Coated fabrics such as are obtained by the processes of Examples 1, 2 and 6, are useful inter alia as printers' blankets. Laminates such as are obtained by the processes of Examples 3, 5 and 7 find an important application as conveyor belting and for this purpose have the important advantage over rubber/fabric belting of much greater fire-resistance.

Fabrics composed of or containing continuous filaments or staple fibres of regenerated cellulose made by the viscose or cuprammonium processes can be used in the same way as the "Fortisan" fabrics in Examples 1 to 7 but with less advantage in respect of the strength of the fabric. Other heat-stable fibre-forming materials composed of linear polymers containing recurring units of carbon, hydrogen and an element more electro negative than carbon can be bonded to vinyl chloride polymers, especially acetone insoluble homopolymers of vinyl chloride, by the method of the invention. Such materials include polyacrylonitrile, nylons, polyethylene terephthalate and poly-4-amino-1.2.4-triazole, and like fibre-forming condensation polymers. These materials may be treated as in Examples 1 to 7 except that the temperature of the hot pressing operation must be below the point at which shrinkage of the material occurs. A temperature of 120° C. to 125° C. is generally suitable for materials that are "heat stable" in the sense defined above. With some fibre-forming polymers, after stretching, a heat stabilisation step is necessary to give the desired freedom from shrinkage.

Instead of employing fabrics composed of continuous filament yarns, fabrics containing or consisting of staple fibre yarns may be used. Thus any of the fabrics in the examples may be replaced by fabrics containing staple fibre yarns of the polymers specified alone or in admixture with continuous filaments or staple fibre yarns of other materials, for example regenerated cellulose, cotton or glass fibre. Fabrics composed of staple fibre yarns of regenerated cellulose or a natural cellulosic textile material, for example cotton or linen, may also be treated with advantage by the process of the invention. The invention is of particular importance in the treatment of fabrics of which at least 50%, and preferably at least 80% of the yarns (by weight) are composed of continuous filaments since it is with such materials that adhesion without the treatment of the invention presents most difficulty. Materials composed of or containing proteinaceous fibres whether in the form of staple fibre yarns or continuous filament yarns may also be treated according to the invention. Such materials include, for example, silk and textiles derived from casein, soya-bean protein, zein or ground-nut protein. For strength, woven fabrics are preferred but knitted fabrics and felts can also be bonded to the vinyl polymer according to the inventor.

When high water resistance is required the regenerated cellulose or other fibrous material may be water-proofed by suitable means before application of the resin. In this connection mention may be made of water-proofing by the application of silane derivatives, e. g. application of alkoxy silanes which are subsequently hydrolysed on the material, and of amino silanes as described in U. S. Patent No. 2,279,418, and of water-proofing by the application of co-ordination compounds of chromic chloride with organic acids especially acrylic acid such, for example, as "Volan Size 118" marketed by E. I. du Pont de Nemours Co.

For further information regarding the resin treatment of the fibrous material, reference is made to our prior U. S. applications S. Nos. 170,701 and 170,702, filed June 27, 1950.

The resin may, if desired, be made in the presence of a plasticizer, e. g. methyl phthalyl ethyl glycollate, ethyl phthalyl ethyl glycollate, butyl phthalyl butyl glycollate, o- and p-toluene sulphonamides or diphenyl phthalate.

The copolymers of vinyl chloride with a small proportion (15% or less) of vinyl acetate are similar in behaviour to polyvinyl chloride and may be used instead thereof.

As plasticizers for the polyvinyl chloride, besides di-(methyl-cyclo-hexyl)-phthalate and tricresyl phosphate, many other plasticizers for polyvinyl chloride can be used, including: dicyclohexyl phthalate, dibutyl-phthalate, dibutyl-cyclohexyl-phthalate, di-(2-ethyl hexyl)-phthalate and the phthalates of other higher aliphatic alcohols, and dibutyl adipate. Polymeric plasticisers for polyvinyl chloride for example polymeric 1.2-propylene glycol sebacate and copolymers of butadiene with acrylonitrile may also be present.

When adopting the solvent method of applying the polyvinyl chloride, volatile solvents that can be used include mixtures of cyclohexanone or cyclopentanone with acetone or methyl ethyl ketone and of carbon bisulphide with acetone. For the vinyl chloride-vinyl acetate copolymers a wider range of solvents including acetone itself is available.

In addition to the solvent and dispersion methods of applying the vinyl polymer, pre-formed films of the polyvinyl chloride and polyvinyl acetate may also be bonded at temperatures above about 80° C. to the resin treated fabric but it is difficult in this way to obtain as strong adhesion as when the polymer is applied in solution or in dispersion in the plasticiser.

The invention is primarily concerned with bonding polyvinyl chloride and copolymers of vinyl chloride with a minor proportion of vinyl acetate to textile materials of the kind referred to. By the same method, however, other linear polymers of vinyl chloride can be bonded to the said textile materials. Examples of such polymers are: copolymers of vinyl chloride with acrylonitrile, especially copolymers containing at least 45% of vinyl chloride (for example 45–80%), copolymers of vinylidene chloride with a minor proportion of vinyl chloride, copolymers of vinyl chloride with methacrylonitrile and various ternary copolymers containing vinyl chloride and vinylidene chloride, acrylonitrile or methacrylonitrile units.

The invention includes also bonding polyvinyl chloride or other polymers of the kind specified to non-fibrous materials, especially non-fibrous webs, of regenerated cellulose or other fibre-forming polymers the molecules of which comprise repeating units containing carbon, hydrogen and a more electro negative element than carbon. Thus for example according to the invention the polyvinyl chloride or other polymer can be bonded to a film of regenerated cellulose, or other of the fibre-forming polymers referred to, after a resin-pretreatment of the film such as has been described for the pretreatment of the textile materials. Moreover, the invention includes bonding together two components each of which is a textile material or non-fibrous web, which has been given the resin-pretreatment, by means of an intermediate layer of the polyvinyl chloride or like acting polymer. Thus, for example two layers of resin-pretreated regenerated cellulose fabric or foil may be coated with plasticised polyvinyl chloride and then united by pressure at a suitable temperature. (This method is useful, for instance in making semi-stiff articles of apparel such as collars and in making decorative materials such as are described in U. S. application S. No. 50,326, filed September 21, 1948, now Patent No. 2,614,954.

Having described our invention what we desire to secure by Letters Patent is:

1. A composite material comprising an acetone-insoluble homopolymer of vinyl chloride bonded to resin coated fibres, said fibres being composed of high tenacity regenerated cellulose and the synthetic resin being a water insoluble, alcohol soluble condensation product of formaldehyde with resorcinol in molar proportions between 1:2 and 1.1:1, the said resin being the sole adhesive between the vinyl polymer and the textile material and the composite material being free from any additional source of formaldehyde.

2. A composite web comprising a plasticised acetone insoluble homopolymer of vinyl chloride adhering to a reinforcement of synthetic-resin coated substantially parallel continuous filament yarns of high tenacity regenerated cellulose, said resin being a water insoluble, alcohol soluble condensation product of formaldehyde with resorcinol in molar proportions between 1:2 and 1.1:2, the said resin being the sole adhesive between the vinyl polymer and the textile material and the composite material being free from any additional source of formaldehyde.

3. A composite web according to claim 2, wherein the reinforcement comprises a woven fabric of which at least 50% by weight of the yarn is composed of high tenacity regenerated cellulose continuous filaments.

4. Composite material comprising a plurality of woven fabrics of which at least 50% by weight of the yarn is composed of high tenacity regenerated cellulose continuous filaments, said fabrics being coated with a synthetic resin which is a water insoluble, alcohol soluble condensation product of formaldehyde and resorcinol in molar proportions between 1:2 and 1.1:1, and said resin coated fabrics being bonded together by layers of a plasticised acetone insoluble homopolymer of vinyl chloride, the said resin being the sole adhesive between the vinyl polymer and the textile material and the composite material being free from any additional source of formaldehyde.

5. Composite material according to claim 4, wherein the molar ratio of formaldehyde to resorcinol in the synthetic resin is between 8.5:10 and 1.1:1.

6. Composite material according to claim 4, wherein the molar ratio of formaldehyde to resorcinol in the synthetic resin is between 1:2 and 8.5:10.

7. A composite material comprising a thermoplastic polymer of vinyl chloride adhering to synthetic-resin coated, heat-stable, fibre-forming material, said material being composed of a linear polymer containing recurring units of carbon, hydrogen, and an element more electronegative than carbon, said resin being a water-insoluble, alcohol-soluble condensation product of formaldehyde with resorcinol, in molar proportions between 1:2 and 1.1:1, and being the sole adhesive between the vinyl polymer and the textile material, and the composite material being free from any source of additional formaldehyde.

8. Process for making a composite material, wherein a dispersion of thermoplastic polymer of vinyl chloride in a plasticiser therefor is applied over the surface of a woven fabric of which at least 50% by weight of the yarn is composed of high tenacity regenerated cellulose continuous filaments, the said fabric being coated with a synthetic resin which is a water insoluble, alcohol soluble condensation product of an aldehyde and a phenol in molar proportions between 1:2 and 1.1:1, and the resin coated fabric is heated to form said dispersion into a gel, the said resin being the sole adhesive between the vinyl polymer and the textile material and the composite material being free from any additional source of formaldehyde.

9. Process according to claim 8, wherein the polymer of vinyl chloride is an acetone insoluble homopolymer and the synthetic resin is a condensation product of formaldehyde and resorcinol in molar proportions between 8.5:10 and 1.1:1.

10. Process according to claim 8, wherein the polymer of vinyl chloride is an acetone insoluble homopolymer and the synthetic resin is a condensation product of formaldehyde and resorcinol in molar proportions between 1:2 and 8.5:10.

11. Process for making a composite material which comprises bonding together by means of layers comprising a thermoplastic polymer of vinyl chloride applied in the form of a dispersion of the polymer in the plasticiser, a plurality of layers of woven fabric of which at least 50% by weight of the yarn of said fabric is composed of high tenacity regenerated cellulose continuous filaments, each layer of fabric being coated with a synthetic resin which is a water insoluble, alcohol soluble condensation product of formaldehyde with a phenol in molar proportions between 1:2 and 1.1:1, the said dispersion being converted into a gel by the application of heat, and the bonding being effected by means of a hot pressing operation, the said resin being the sole adhesive between the vinyl polymer and the textile material and the composite material being free from any additional source of formaldehyde.

12. Process according to claim 11, wherein the synthetic resin is a condensation product of formaldehyde and resorcinol in molar proportions between 8.5:10 and 1.1:1.

13. Process according to claim 11, wherein the synthetic resin is a condensation product of formaldehyde and resorcinol in molar proportions between 8.5:10 and 1.1:1, and the polymer of vinyl chloride is an acetone-insoluble homopolymer thereof.

ALEXANDER HENDERSON GENTLE.
THOMAS JACKSON.

References Cited in the file of this patent

UNITED STATES PATENTS

| Number | Name | Date |
|---|---|---|
| 2,128,229 | Charch et al. | Aug. 30, 1938 |
| 2,449,180 | Schroeder | Sept. 14, 1948 |
| 2,497,454 | Illingworth et al. | Feb. 14, 1950 |

OTHER REFERENCES

"Modern Synthetic Rubbers," Barron, 3rd edition, November 1, 1950, page 543.

"Butalastic Polymers," Marchionna, 1946, page 300.